US009734519B2

(12) United States Patent
Boyle (10) Patent No.: US 9,734,519 B2
(45) Date of Patent: Aug. 15, 2017

(54) NATIVE ADVERTISEMENT SMART INJECTION

(71) Applicant: Yahoo! Inc., Sunnyvale, CA (US)

(72) Inventor: Kieran Boyle, Redwood City, CA (US)

(73) Assignee: Excalibur IP, LLC, New York, NY (US)

( * ) Notice: Subject to any disclaimer, the term of this patent is extended or adjusted under 35 U.S.C. 154(b) by 395 days.

(21) Appl. No.: 14/584,401

(22) Filed: Dec. 29, 2014

(65) Prior Publication Data

US 2016/0189248 A1 Jun. 30, 2016

(51) Int. Cl.
*G06F 17/00* (2006.01)
*G06Q 30/02* (2012.01)
*G06F 17/22* (2006.01)
*H04L 29/08* (2006.01)

(52) U.S. Cl.
CPC ..... *G06Q 30/0277* (2013.01); *G06F 17/2247* (2013.01); *H04L 67/02* (2013.01)

(58) Field of Classification Search
CPC ............. G06Q 30/0277; G06Q 30/241; G06Q 30/0251
See application file for complete search history.

(56) References Cited

U.S. PATENT DOCUMENTS

| | | | | |
|---|---|---|---|---|
| 2004/0093327 | A1* | 5/2004 | Anderson | G06Q 30/02 |
| 2013/0332815 | A1* | 12/2013 | Gallo | G09B 21/008 |
| | | | | 715/234 |
| 2014/0208199 | A1* | 7/2014 | Peleg | G06Q 30/0277 |
| | | | | 715/234 |

* cited by examiner

*Primary Examiner* — Andrew McIntosh
(74) *Attorney, Agent, or Firm* — Mauriel Kapouytian Woods LLP; Serge Krimnus; James Woods (57) ABSTRACT

Techniques are provided that include generating a single script block for placement at a single location on an HTML document in response to a creation of one or more ad units for the HTML document, the single script block including one or more section codes that correspond to one or more content blocks of the HTML document. A syndication script for obtaining logic and metadata is generated for injecting native advertisements in the HTML document based on the one or more section codes. The syndication script is provided in response to a request generated by the single script block, and one or more native advertisements are provided in response to an ad call generated by the syndication script, the one or more native advertisements for injection in the one or more content blocks of the HTML document based on the logic and metadata. The ad request may contain one or more sections containing the metadata of the XPath identifying nodes within a Document Object Model of the HTML document as native ad placement containers.

18 Claims, 7 Drawing Sheets

NATIVE ADVERTISEMENT SMART INJECTION

BACKGROUND

Native advertising, as well as native content generally, is of increasing importance. For example, native advertisements may perform well, yet may be relatively unobtrusive to the user's experience.

Native ad rendering typically requires providing individual script blocks for each ad, which need to be placed in the correct locations (e.g., sections) on a publisher's website. This technique is limited and does not provide the ability to serve multiple ads or define starting positions within content. For example, each ad would require its own script and it would need to be implemented in each section N times to achieve multiple ad serves. Also, for the ads to look and feel like the website they are being rendered to (i.e., for the ads to be native ads), additional manual coding effort is required from the advertiser.

SUMMARY

Some embodiments of the invention provide techniques, for example, in connection with native advertisement, or non-advertising content, placement. In some embodiments, a single script block is generated for placement at a single location on an HTML document in response to a creation of one or more ad units for the HTML document, the single script block including one or more section codes that correspond to one or more sections of the HTML document. A syndication script for obtaining logic and metadata is generated for injecting native advertisements in the HTML document based on the one or more section codes. The syndication script is provided in response to a request generated by the single script block, and one or more native advertisements are provided in response to an ad call generated by the syndication script, the one or more native advertisements for injection in the one or more sections of the HTML document based on the logic and metadata. In some embodiments, the metadata may include an XPath per section identifying nodes within a Document Object Model of the HTML document as native ad placement containers. In some embodiments, the syndication script may obtain logic for filtering child nodes within the Document Object Model to include only matching structures of the XPath(s) for subsequent injections of native advertisements. The one or more native advertisements may include a plurality of ad unit formats.

In some embodiments, the metadata may include a start position for injecting native advertisements.

In some embodiments, the metadata may include a skip parameter for determining locations for subsequent injections of native advertisements.

In some embodiments, the metadata may include a total ads parameter for determining a maximum number of native advertisements to serve.

In some embodiments, the single script block may be generated in response to inputs at a user interface for creating the one or more ad units for the HTML document.

In some embodiments, the request for the syndication script may be asynchronously generated by the single script block when a user accesses the HTML document.

In some embodiments, the syndication script may automatically generate the ad call upon storage and installation at a user device used for accessing the HTML document.

While embodiments of the invention are described largely in connection with native advertisement placement, it is to be understood that techniques according to various embodiments of the invention can also be used for other purposes, including native content placement, even if such content is non-advertising content.

While the invention is described with reference to the above drawings, the drawings are intended to be illustrative, and the invention contemplates other embodiments within the spirit of the invention.

DETAILED DESCRIPTION

The present invention now will be described more fully hereinafter with reference to the accompanying drawings, which form a part hereof, and which show, by way of illustration, specific embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on"

is not exclusive and allows for being based on additional factors not described, unless the context clearly dictates otherwise. In addition, throughout the specification, the meaning of "a," "an," and "the" includes plural references. The meaning of "in" includes "in" and "on." Herein, "ad" and "advertisement" are used interchangeably.

It is noted that description herein is not intended as an extensive overview, and as such, concepts may be simplified in the interests of clarity and brevity.

Herein, native ads, native ad smart injection, and injection, among other terms, are intended to have broad scope. Native ads can be or include, without limitation, any of many different types of advertisements, including all that are described herein, among others. "Injection", as the term is used herein, is intended to have broad scope, covering, and can include, among other things, activities or conduct in connection with obtaining, storing, determining, configuring, selecting, ranking, retrieving, targeting, matching, serving and presenting items, such as advertisements. Furthermore, although embodiments are described largely in connection with native advertisement injection, various embodiments and techniques can be used in other areas, such as, for instance, non-advertising item or content injection, or other areas including non-advertising items or content.

Figure 1:
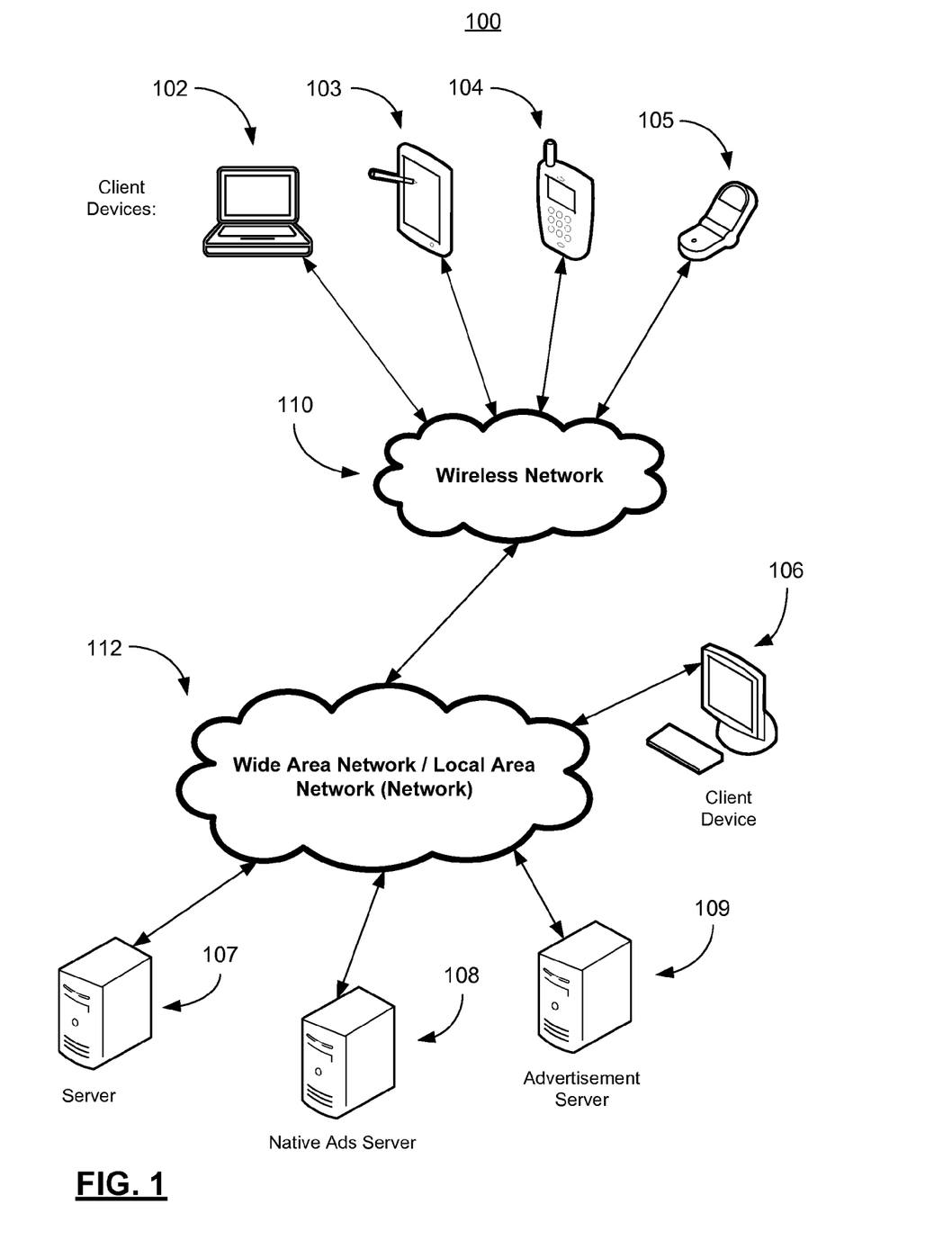
FIG. 1 illustrates a block diagram of a distributed computer system that can implement one or more aspects of a native advertisement smart injection system or method according to one embodiment of the invention.

FIG. 1 illustrates components of one embodiment of an environment in which the invention may be practiced. Not all of the components may be required to practice the invention, and variations in the arrangement and type of the components may be made without departing from the spirit or scope of the invention. As shown, the system 100 includes one or more local area networks ("LANs")/wide area networks ("WANs") 112, one or more wireless networks 110, one or more wired or wireless client devices 106, mobile or other wireless client devices 102-105, one or more servers 107, one or more native ads servers 108 (or, in other embodiments, native content servers or native non-advertising content servers), such as may include one or more native advertisements injection engines, and one or more advertisement servers 109 (or, in other embodiments, content or non-advertising content servers), and may include or communicate with one or more data stores or databases. Various of the client devices 102-106 may include, for example, desktop computers, laptop computers, set top boxes, tablets, cell phones, smart phones, etc. The servers 107-109 can include, for example, one or more application servers, content servers, search servers, etc.

An advertisement server can include, for example, a computer server that has a role in connection with online advertising, such as, for example, in obtaining, storing, determining, configuring, selecting, ranking, retrieving, targeting, matching, serving and presenting online advertisements to users, such as on websites, in applications, and other places where users will see them, etc.

Figure 2:
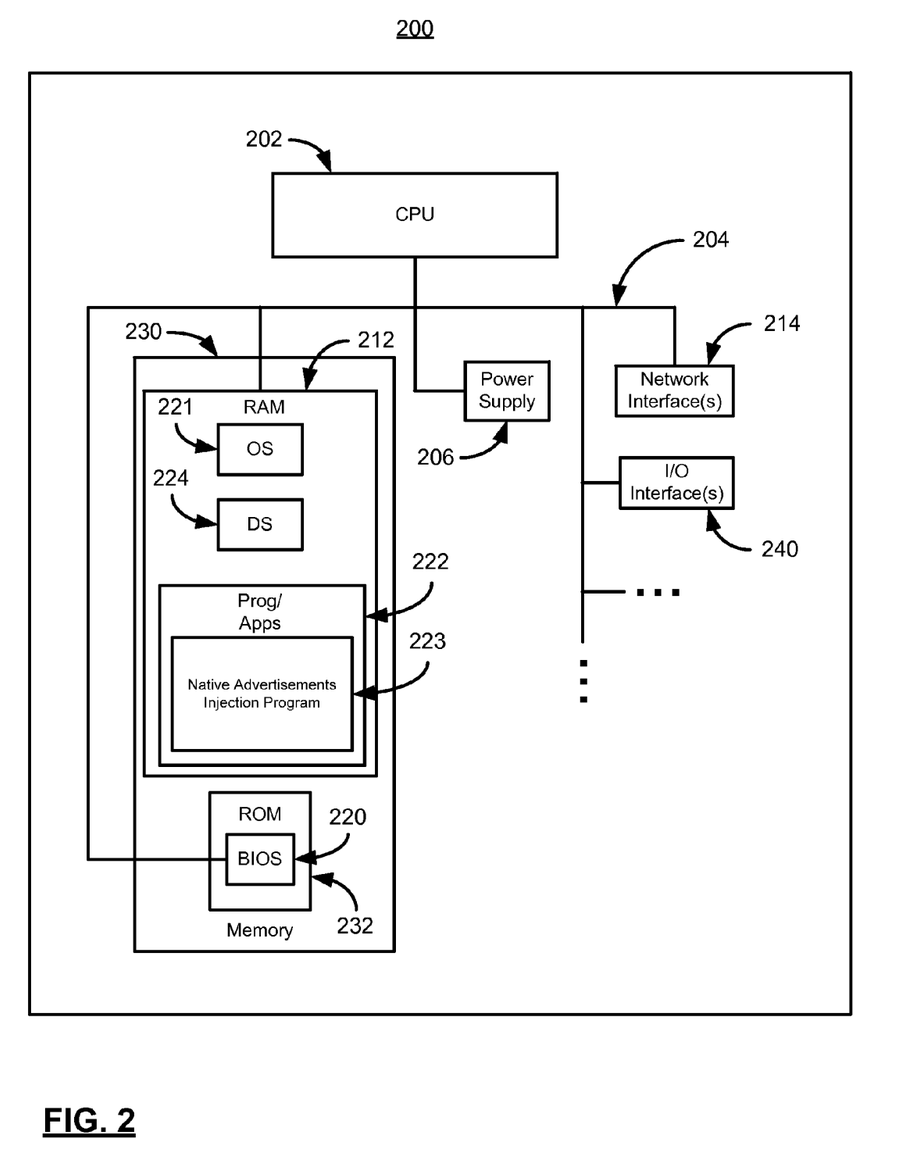
FIG. 2 illustrates a block diagram of an electronic device that can implement one or more aspects of a native advertisement smart injection system or method according to one embodiment of the invention.

FIG. 2 illustrates a block diagram of an electronic device 200 that can implement one or more aspects of a native advertisement smart injection system or method according to one embodiment of the invention. Instances of the electronic device 200 may include servers, e.g. servers 107-109, and client devices, e.g., client devices 102-106. In general, the electronic device 200 can include a processor 202, memory 230, a power supply 206, and input/output (I/O) components 240, e.g., microphones, speakers, displays, touchscreens, keyboards, keypads, GPS components, etc., which may be operable, for example, to provide graphical user interfaces. The electronic device 200 can also include a communications bus 204 that connects the aforementioned elements of the electronic device 200. Network interfaces 214 can include a receiver and a transmitter (or transceiver), and an antenna for wireless communications.

The processor 202 can include one or more of any type of processing device, e.g., a central processing unit (CPU). Also, for example, the processor can be central processing logic. Central processing logic, or other logic, may include hardware, firmware, software, or combinations thereof, to perform one or more functions or actions, or to cause one or more functions or actions from one or more other components. Also, based on a desired application or need, central processing logic, or other logic, may include, for example, a software controlled microprocessor, discrete logic, e.g., an application specific integrated circuit (ASIC), a programmable/programmed logic device, memory device containing instructions, etc., or combinatorial logic embodied in hardware. Furthermore, logic may also be fully embodied as software.

The memory 230, which can include RAM 212 and ROM 232, can be enabled by one or more of any type of memory device, e.g., a primary (directly accessible by the CPU) or secondary (indirectly accessible by the CPU) storage device (e.g., flash memory, magnetic disk, optical disk). The RAM can include an operating system 221, data storage 224, which may include one or more databases, and programs and/or applications 222, which can include, for example, software aspects of the native advertisements injection program 223. The ROM 232 can also include BIOS 220 of the electronic device.

The program 223 is intended to broadly include or represent all programming, applications, algorithms, software and other tools necessary to implement or facilitate methods and systems according to embodiments of the invention. The elements of the program 223 may exist on a single server computer or be distributed among multiple computers or devices or entities, which can include advertisers, publishers, data providers, etc. In some embodiments, the program 223 may be or include a native advertisement injection engine. In other embodiments, the program 223 can be a native content, or native non-advertising content, injection program.

The power supply 206 contains one or more power components, and facilitates supply and management of power to the electronic device 200.

The input/output components, including I/O interfaces 240, can include, for example, any interfaces for facilitating communication between any components of the electronic device 200, components of external devices (e.g., components of other devices of the network or system 100), and end users. For example, such components can include a network card that may be an integration of a receiver, a transmitter, and one or more input/output interfaces. A network card, for example, can facilitate wired or wireless communication with other devices of a network. In cases of wireless communication, an antenna can facilitate such communication. Also, some of the input/output interfaces 240 and the bus 204 can facilitate communication between components of the electronic device 200, and in an example can ease processing performed by the processor 202.

Where the electronic device 200 is a server, it can include a computing device that can be capable of sending or receiving signals, e.g., via a wired or wireless network, or may be capable of processing or storing signals, e.g., in memory as physical memory states. The server may be an application server that includes a configuration to provide one or more applications, e.g., aspects of the native advertisements injection program 223, via a network to another device. Also, an application server may, for example, host a Web site that can provide a user interface for administration of example aspects of the native advertisements injection program 223.

Any computing device capable of sending, receiving, and processing data over a wired and/or a wireless network may act as a server, such as in facilitating aspects of implementations of the native advertisements injection program 223. Thus, devices acting as a server may include devices such as dedicated rack-mounted servers, desktop computers, laptop computers, set top boxes, integrated devices combining one or more of the preceding devices, etc.

Servers may vary in widely in configuration and capabilities, but they generally include one or more central processing units, memory, mass data storage, a power supply, wired or wireless network interfaces, input/output interfaces, and an operating system such as Windows Server, Mac OS X, Unix, Linux, FreeBSD, etc.

A server may include, for example, a device that is configured, or includes a configuration, to provide data or content via one or more networks to another device, such as in facilitating aspects of an example native advertisements injection program 223. One or more servers may, for example, be used in hosting a Web site, such as the Yahoo! Web site. One or more servers may host a variety of sites, such as, for example, business sites, informational sites, social networking sites, educational sites, wikis, financial sites, government sites, personal sites, etc.

Servers may also, for example, provide a variety of services, such as Web services, third-party services, audio services, video services, email services, instant messaging (IM) services, SMS services, MMS services, FTP services, voice or IP (VOIP) services, calendaring services, phone services, advertising services etc., all of which may work in conjunction with example aspects of an example native advertisements injection program 223. Content may include, for example, text, images, audio, video, advertisements, etc.

In example aspects of the native advertisements injection program 223, client devices may include, for example, any computing device capable of sending and receiving data over a wired and/or a wireless network. Such client devices may include desktop computers as well as portable devices such as cellular telephones, smart phones, display pagers, radio frequency (RF) devices, infrared (IR) devices, Personal Digital Assistants (PDAs), handheld computers, GPS-enabled devices tablet computers, sensor-equipped devices, laptop computers, set top boxes, wearable computers, integrated devices combining one or more of the preceding devices, etc.

Client devices, as may be used in example native advertisements placement programs, may range widely in terms of capabilities and features. For example, a cell phone, smart phone or tablet may have a numeric keypad and a few lines of monochrome LCD display on which only text may be displayed. In another example, a Web-enabled client device may have a physical or virtual keyboard, data storage (such as flash memory or SD cards), accelerometers, gyroscopes, GPS or other location-aware capability, and a 2D or 3D touch-sensitive color screen on which both text and graphics may be displayed.

Client devices, such as client devices 102-106, for example, as may be used in example native advertisements injection programs, may run a variety of operating systems, including personal computer operating systems such as Windows, iOS or Linux, and mobile operating systems such as iOS, Android, and Windows Mobile, etc. Client devices may be used to run one or more applications that are configured to send or receive data from another computing device. Client applications may provide and receive textual content, multimedia information, etc. Client applications may perform actions such as browsing webpages, using a web search engine, sending and receiving messages via email, SMS, or MMS, playing games (such as fantasy sports leagues), receiving advertising, watching locally stored or streamed video, or participating in social networks.

In example aspects of the native advertisements injection program 223, one or more networks, such as networks 110 or 112, for example, may couple servers and client devices with other computing devices, including through wireless network to client devices. A network may be enabled to employ any form of computer readable media for communicating information from one electronic device to another. A network may include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling data to be sent from one to another.

Communication links within LANs may include twisted wire pair or coaxial cable, while communication links between networks may utilize analog telephone lines, cable lines, optical lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and a telephone link.

A wireless network, such as wireless network 110, as in an example native advertisements injection program 223, may couple devices with a network. A wireless network may employ stand-alone ad-hoc networks, mesh networks, Wireless LAN (WLAN) networks, cellular networks, etc.

A wireless network may further include an autonomous system of terminals, gateways, routers, or the like connected by wireless radio links, or the like. These connectors may be configured to move freely and randomly and organize themselves arbitrarily, such that the topology of wireless network may change rapidly. A wireless network may further employ a plurality of access technologies including 2nd (2G), 3rd (3G), 4th (4G) generation, Long Term Evolution (LTE) radio access for cellular systems, WLAN, Wireless Router (WR) mesh, etc. Access technologies such as 2G, 2.5G, 3G, 4G, and future access networks may enable wide area coverage for client devices, such as client devices with various degrees of mobility. For example, wireless network may enable a radio connection through a radio network access technology such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, etc. A wireless network may include virtually any wireless communication mechanism by which information may travel between client devices and another computing device, network, etc.

Internet Protocol may be used for transmitting data communication packets over a network of participating digital communication networks, and may include protocols such as TCP/IP, UDP, DECnet, NetBEUI, IPX, Appletalk, and the like. Versions of the Internet Protocol include IPv4 and IPv6. The Internet includes local area networks (LANs), wide area networks (WANs), wireless networks, and long haul public networks that may allow packets to be communicated between the local area networks. The packets may be transmitted between nodes in the network to sites each of which has a unique local network address. A data communication packet may be sent through the Internet from a user site via an access node connected to the Internet. The packet may be forwarded through the network nodes to any target site connected to the network provided that the site address of the target site is included in a header of the packet. Each packet communicated over the Internet may be routed via a path determined by gateways and servers that switch the packet according to the target address and the availability of a network path to connect to the target site.

A "content delivery network" or "content distribution network" (CDN), as may be used in an example native advertisements placement program 223, generally refers to a distributed computer system that comprises a collection of autonomous computers linked by a network or networks, together with the software, systems, protocols and techniques designed to facilitate various services, such as the storage, caching, or transmission of content, streaming media and applications on behalf of content providers. Such services may make use of ancillary technologies including, but not limited to, "cloud computing," distributed storage, DNS request handling, provisioning, data monitoring and reporting, content targeting, personalization, and business intelligence. A CDN may also enable an entity to operate and/or manage a third party's Web site infrastructure, in whole or in part, on the third party's behalf.

A peer-to-peer (or P2P) computer network relies primarily on the computing power and bandwidth of the participants in the network rather than concentrating it in a given set of dedicated servers. P2P networks are typically used for connecting nodes via largely ad hoc connections. A pure peer-to-peer network does not have a notion of clients or servers, but only equal peer nodes that simultaneously function as both "clients" and "servers" to the other nodes on the network.

Some embodiments include direct or indirect use of social networks and social network information, such as in targeted advertising or advertisement selection. A "Social network" refers generally to a network of acquaintances, friends, family, colleagues, and/or coworkers, and potentially the subsequent connections within those networks. A social network, for example, may be utilized to find more relevant connections for a variety of activities, including, but not limited to, dating, job networking, receiving or providing service referrals, content sharing, creating new associations or maintaining existing associations with like-minded individuals, finding activity partners, performing or supporting commercial transactions, etc.

A social network may include individuals with similar experiences, opinions, education levels and/or backgrounds, or may be organized into subgroups according to user profile, where a member may belong to multiple subgroups. A user may have multiple "1:few" circles, such as their family, college classmates, or coworkers.

A person's online social network includes the person's set of direct relationships and/or indirect personal relationships. Direct personal relationships refers to relationships with people the user communicates with directly, which may include family members, friends, colleagues, coworkers, and the like. Indirect personal relationships refers to people with whom a person has not had some form of direct contact, such as a friend of a friend, or the like. Different privileges and permissions may be associated with those relationships. A social network may connect a person with other people or entities, such as companies, brands, or virtual persons. A person's connections on a social network may be represented visually by a "social graph" that represents each entity as a node and each relationship as an edge.

Users may interact with social networks through a variety of devices. Multi-modal communications technologies may enable consumers to engage in conversations across multiple devices and platforms, such as cell phones, smart phones, tablet computing devices, personal computers, televisions, SMS/MMS, email, instant messenger clients, forums, and social networking sites (such as Facebook, Twitter, and Google+), or others.

In some example native advertisements injection program 223, various monetization techniques or models may be used in connection with contextual or non-search related advertising, as well as in sponsored search advertising, including advertising associated with user search queries, and non-sponsored search advertising, including graphical or display advertising. In an auction-based online advertising marketplace, advertisers may bid in connection with placement of advertisements, although many other factors may also be included in determining advertisement selection or ranking Bids may be associated with amounts the advertisers pay for certain specified occurrences, such as for placed or clicked-on advertisements, for example. Advertiser payment for online advertising may be divided between parties including one or more publishers or publisher networks, and one or more marketplace facilitators or providers, potentially among other parties.

Some models include guaranteed delivery advertising, in which advertisers may pay based on an agreement guaranteeing or providing some measure of assurance that the advertiser will receive a certain agreed upon amount of suitable advertising, and non-guaranteed delivery advertising, which may be individual serving opportunity-based or spot market-based. In various models, advertisers may pay based on any of various metrics associated with advertisement delivery or performance, or associated with measurement or approximation of a particular advertiser goal. For example, models can include, among other things, payment based on cost per impression or number of impressions, cost per click or number of clicks, cost per action for some specified action, cost per conversion or purchase, or cost based on some combination of metrics, which can include online or offline metrics.

The process of buying and selling online advertisements may include or require the involvement of a number of different entities, including advertisers, publishers, agencies, networks, and developers. To simplify this process, some companies provide mutual organization systems called "ad exchanges" that connect advertisers and publishers in a unified platform to facilitate the bidded buying and selling of online advertisement inventory from multiple ad networks. "Ad networks" refers to companies that aggregate ad space supply from publishers and provide en masse to advertisers.

For Web portals, such as Yahoo!®, advertisements may be displayed on web pages resulting from a user-defined search based upon one or more search terms. Such advertising is most beneficial to users, advertisers and web portals when the displayed advertisements are relevant to the web portal user's interests. Thus, a variety of techniques have been developed to infer the user's interests/intent and subsequently target the most relevant advertising to that user.

One approach to improving the effectiveness of presenting targeted advertisements to those users interested in receiving product information from various sellers is to employ demographic characteristics (i.e., age, income, sex, occupation, etc.) for predicting the behavior of groups of different users. Advertisements may be presented to each user in a targeted audience based upon predicted behaviors rather than in response to certain keyword search terms.

Another approach is profile-based ad targeting. In this approach, user profiles specific to each user are generated to model user behavior, for example, by tracking each user's path through a web site or network of sites, and then compiling a profile based on what pages and advertisements were delivered to the user. Using aggregated data, a correlation develops between users in a certain target audience and the products that those users purchase. The correlation then is used to target potential purchasers by targeting content or advertisements to the user at a later time.

During the presentation of advertisements, the presentation system may collect detailed information about the type of advertisements presented to the user. This information may be used for gathering analytic information on the advertising or potential advertising within the presentation. A broad range of analytic information may be gathered, including information specific to the advertising presentation system. Advertising analytics gathered may be transmitted to locations remote to the local advertising presentation system for storage or for further analysis. Where such advertising analytics transmittal is not immediately available, the gathered advertising analytics may be saved by the advertising presentation system until the transmittal of those advertising analytics becomes available.

Some embodiments of the invention relate, directly or indirectly to native advertisement injection. Native advertisements can include, among other things, advertisements, such as online advertisements, that, to some degree, blend, match, flow with, or are in some ways similar to the context of the user's experience, such as may include non-advertising items or content. In some embodiments, Native ads can include, among other things, formats that may match or be similar to the form or function of the user experience in which the ad is presented. In some embodiments, native advertisements may seem less obtrusive or intrusive to the user or to the user's experience.

Some embodiments of the invention provide systems, methods, platforms and techniques relating to native ads, such as in connection with injection of native ads. Some embodiments include automatically detecting, locating, determining or selecting candidate locations, locations, contexts, or situations for placing or serving native ads, such as, for example, on or positioned in, or within content of, a publisher's Web site. This may include determining, for example, locations or placements, relative locations or placements, or appropriate, good or optimized locations or placements for the native ads. Such locations or placements may, for example, be at least partly based on factors consistent with form and function of native ads, which can, in some embodiments, include, among other things, non-intrusiveness, non-intrusive look or feel, continuity or blending, or a desired degree of continuity or blending with context and content, content-relatedness, not interfering with user experience or confusing users, high probability of attention, click or other desirable user action, or others. In various embodiments, this may be done without user (such as, for example, a publisher or agent of a publisher) input or action during the process, automatically, semi-automatically, or in user-assisted fashion. Some embodiments include analysis or automatic analysis of publishers' Web sites, such as, for example, in determining the candidate locations or the locations.

In some embodiments, a user (as an example, a publisher) selects (such as through a user-facing GUI) one or more Document Object Model (DOM) elements (or content or items associated with such elements), which may relate, for example, to a publisher's HTML Page (which can relate to content or other elements). A native advertisement smart injection system or engine may then use one of several approaches, using the selected DOM elements, to determine native advertisement placement candidate containers from the DOM.

In some embodiments, determined candidate containers may be useable in determining native advertisement injection, such as, for example, in connection with particular content or content items associated with the candidate containers, or some of them. This can include, for example, among other things, placing, which can include targeting, serving, presenting, etc., native advertisements in association with such content or content items, such as in or near such content or content items, within a group, flow or visible flow of such content or content items, positioning the advertisement within, adjacent to, or as part of such content or content items, etc.

Some embodiments provide content-guided native advertisements injection systems and methods. In some embodiments, some of the difficulties of a Native Ads serving platform may be avoided or mitigated by techniques that include detection of candidate native ad placements on publishers' properties. In some embodiments, automating native ad placement detection can reduce adoption friction and can help reduce integration, for example, from weeks to hours. Some embodiments approach the problem of Native Ad Document Object Model (DOM) element detection in a qualitatively different viewpoint than other embodiments. Searching is performed for secondary sources for the main content that is available on, for example, a publisher's property. For each article on the secondary source, searching is performed for the corresponding content on the main web property and then detecting is performed of the DOM element that encompasses all HTML tags associated with that content. For example, two alternative sources of secondary information may be utilized, namely RSS and mobile web properties (that may be, by necessity, mainly content-focused.)

Some embodiments of the invention provide generalized XPaths (where XPaths relate to XML Path Language) for native advertisement smart injection systems and methods. In some embodiments, generalized XPaths may relate to return or output of DOM traversal or DOM related analysis according to techniques or algorithms, or portions thereof, according to some embodiments of the invention. A starting point may be the DOM of the publisher's HTML property. In some user-assisted embodiments, the user, such as the publisher, is requested to select one or more elements within what they consider to be an appropriate DOM element for native advertisements placement. The system detects the deepest DOM node that is an ancestor of all user-selected elements and computes its path from the DOM root in the form of an XPath where only the HTML tag names are considered. This XPath will correspond to a set of k DOM elements, as it points on an element within a candidate native ad container which, in some embodiments, by definition, appears more than once on the page. In some embodiments, the system then repeatedly traverses the path towards the DOM root until it reaches a position where the corresponding XPath corresponds to less than k DOM nodes. The last XPath created that corresponds to k nodes may be the system's result, while its associated k DOM nodes are the candidate native ad placement locations.

Figure 3:
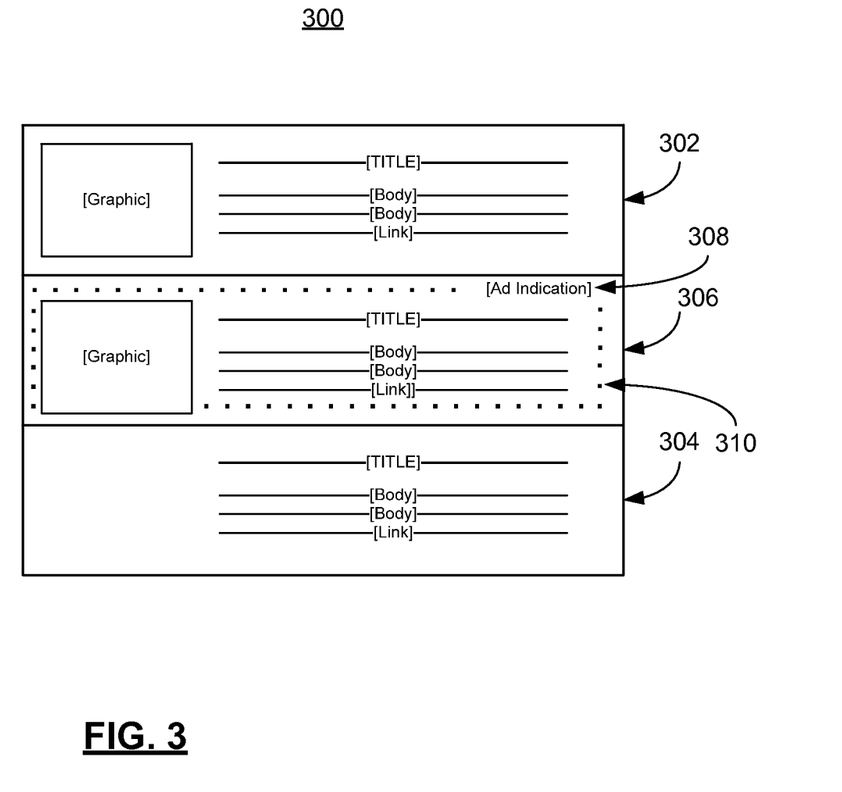
FIG. 3 illustrates a block diagram of a graphical user interface according to one embodiment of the invention.

FIG. 3 illustrates a block diagram of a graphical user interface 300 according to one embodiment of the invention. In particular, FIG. 3 provides a simplified illustration of a portion of a web page including a native ad 306, injection of which can be facilitated by techniques according to the invention. As depicted, the native ad 306, appears in, or injected or placed into, a group, series or flow of content items 302, 304, such as native content items. Form and function of native ads can, of course, vary, but, as depicted, the native ad 306 including a textual indication 308 that is an ad, which may also be a link, etc., as well as shading, as represented by dots 310, which may, in some embodiments, distinguish or subtly distinguish the native ad from other content items while not breaking abruptly or drastically from the content item context, for example. Each of the native ad 306 and the content items 302, 304 may include various components, which can include sub-items or sub-content, such as a link (such to an article, other content item, larger ad, etc.) title, body text, one or more graphics, and may include any number of other components, such as audio, video, etc.

Some embodiments of the invention include determining one or more HTML containers (which may include one or more meta-containers containing multiple smaller containers) with which native ads may be associated, such as by eventually or potentially being placed into or adjacent to. For example, as depicted in FIG. 3, some embodiments of the invention may include determining an HTML container associated with the set of content items that include content items 302 and 304. As depicted, the native ad 306 is injected in the flow or group of content items that include content items 302 and 304, and may include other content items that are not depicted.

Figure 4:
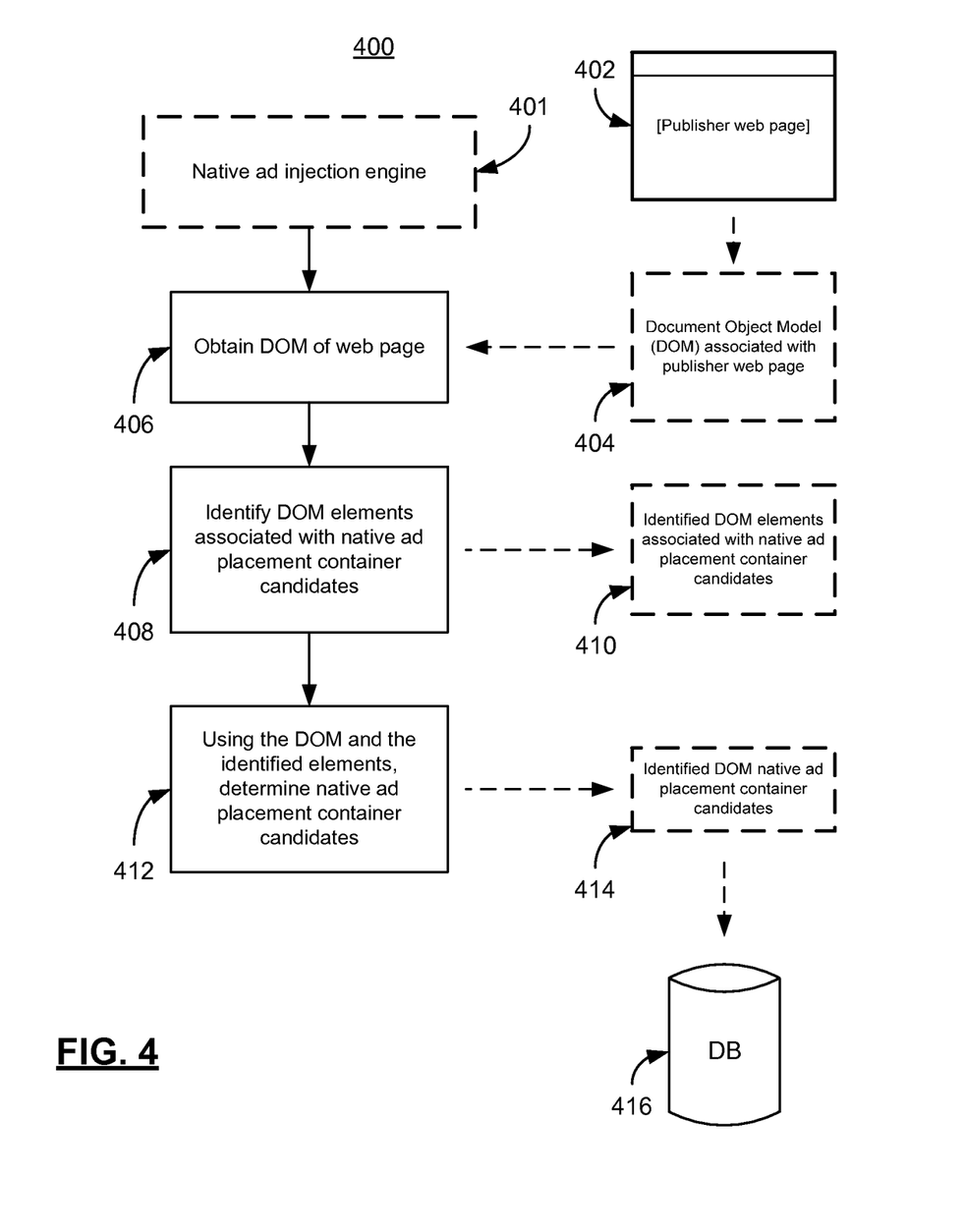
FIG. 4 illustrates a flow diagram of example operations of one or more aspects of a system or method according to one embodiment of the invention.

FIG. 4 illustrates a flow diagram 400 of example operations of one or more aspects of a system or method according to one embodiment of the invention. As depicted, the steps are carried out by a native ad injection engine 401. FIG. 4 presents possible ways in which candidate or actual containers for native ads may be determined. However, in other embodiments, other techniques may be used, and/or such information or related or other information may be provided to and used by the native ad injection engine 401.

At step 406, the native ad injection engine 401 obtains a DOM 404 of a web page, such as a publisher web page 402 onto which ads are to be placed.

At step 408, the engine 401 identifies DOM elements 410 associated with native ad placement container candidates. In some embodiments, this can include identifying DOM elements associated with containers that would or might make good, appropriate, fitting, etc, native ad placement container candidates.

At step 412, the engine 401, using the DOM and the identified elements, perhaps among other things, determines native ad placement container candidates 414.

Throughout the steps depicted in FIG. 4, data may be stored, sent, and received to and from one or more databases 416 accessible directly or indirectly by the engine 401.

Previously, multiple scripts were needed in order to deliver multiple advertisements on a publisher HTML document, such as a web page. Further, manual template extraction was necessary to customize ad units to appear like other content on a publisher HTML document.

However, it has been observed that multiple native ad units can be delivered by placing a single script block at a single location of a publisher HTML document. Further, an HTML document's existing styling and template structure may be used for injecting native advertisements that include, among other things, formats that may match or be similar to the form or function of the user experience in which the ad is presented.

Figure 5:
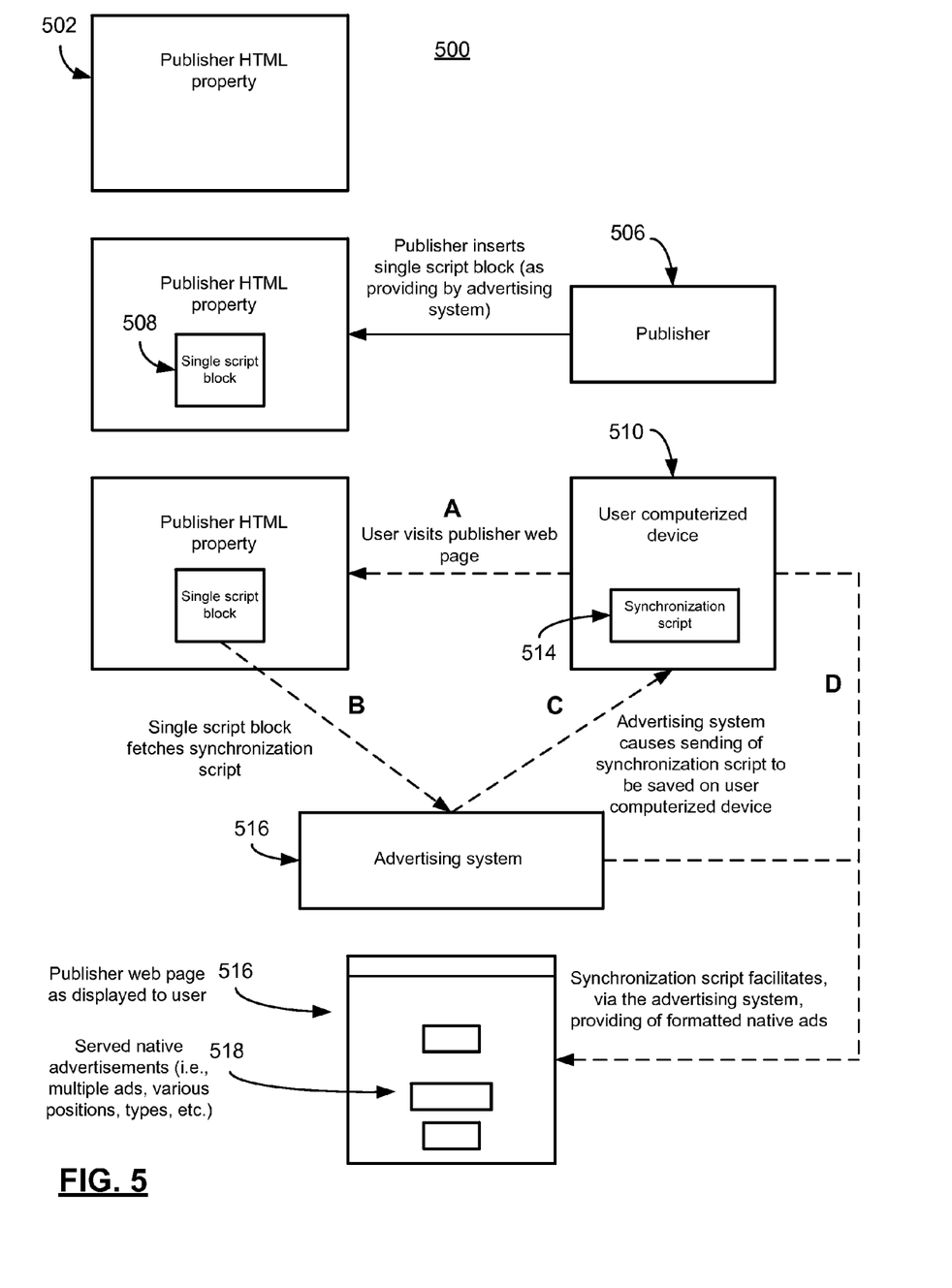
FIG. 5 illustrates a block diagram of example operations of one or more aspects of a system or method according to one embodiment of the invention.

FIG. 5 illustrates a block diagram 500 of example operations of one or more aspects of a system or method according to one embodiment of the invention. Block 502 represents a publisher HTML property.

Block 506 represents a publisher (or publisher agent, etc.), who inserts a single script block 508, as providing by an advertising system, according to some embodiments, at a single location in the publisher HTML property.

Block 510 represents a computerized device of a user (such as a computer, tablet, smart phone, handheld, etc.). As depicted by A, the user visits the web page 516 of the publisher associated with the publisher HTML property. As depicted by B, in some embodiments in response to the user visiting the web page, the single script block 508 fetches a synchronization script 514 from an advertising system 516. As depicted by C, the advertising system facilitates or causes the sending of the synchronization script 514 to be saved on the user's computerized device 510. As depicted by D, the synchronization script 514 facilitates, such as via or along with the advertising system 516, providing, such as may include selection and serving, of formatted native ads 518 to the publisher web page 516 as displayed to the user, according to some embodiments of the invention. Potentially multiple native ads can be provided at different identified positions, of different identified formats and types, etc. In some embodiments, A, B, C and D occur in the order presented above, but other embodiments are possible with different sequencing, differentiation, etc.

Figure 6:
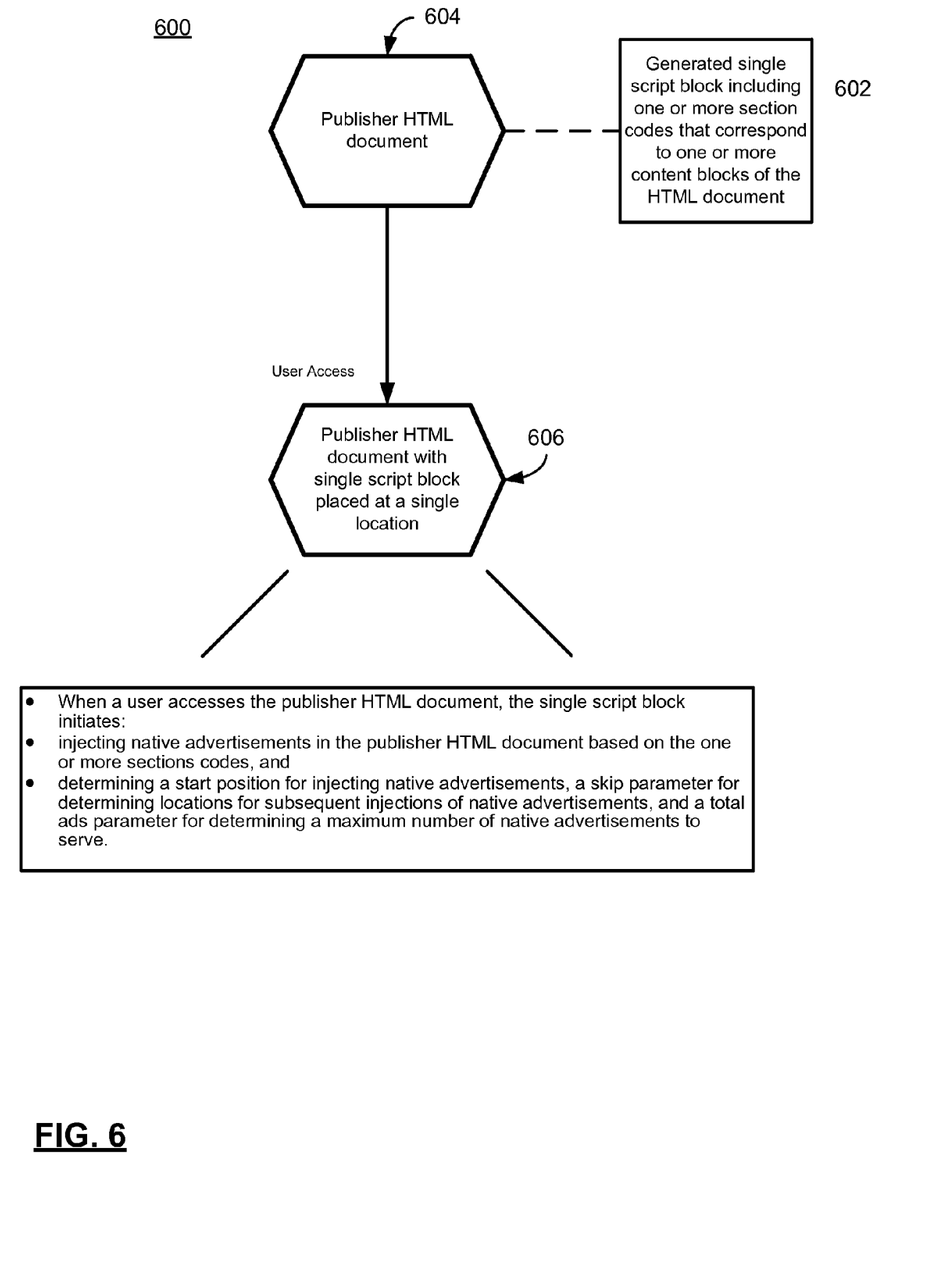
FIG. 6 illustrates a flow diagram of example operations of one or more aspects of a system or method according to one embodiment of the invention.

FIG. 6 illustrates a flow diagram of example operations of one or more aspects of a system or method according to one embodiment of the invention. In flow diagram 600, a single script block 602 (e.g., a JavaScript snippet) is generated for placement at a single location on a publisher HTML document 604 in response to a creation of one or more ad units for the publisher HTML document. For example, the single script block 602 may include one or more section codes that correspond to one or more content blocks of the publisher HTML document. In some embodiments, the single script block 602 may be generated in response to inputs at a user interface for creating the one or more ad units for the publisher HTML document 604.

When a user accesses the publisher HTML document with the single script block placed at a single location 606, using the techniques herein, the single script block initiates injecting native advertisements in the publisher HTML document based on the one or more sections codes based on, for example, (1) a start position for injecting native advertisements, (2) a skip parameter for locations for subsequent injections of native advertisements, and (3) a total ads parameter for a maximum number of native advertisements to serve.

A publisher may create and save ad units by using an ad builder program, such as, for example, the Gemini Syndication publisher portal ad builder tool. Another publisher ad builder tool is described in U.S. patent application Ser. No. 14/252,529, filed Apr. 14, 2014, the disclosure of which is incorporated herein by reference in its entirety.

In an embodiment, when a publisher creates and saves an ad unit using an ad builder tool, a corresponding single script block (e.g., a JavaScript snippet) is generated for the publisher to include at a single location on their HTML document, e.g., at the bottom of the publisher's webpage. In some embodiments, the single script block includes one or more section codes (generated, for example, by an ad server system) corresponding to one or more content blocks on the publisher HTML document, e.g., content streams which may be repeating sections of content that are uniformly styled within the publisher HTML document. In some embodiments, the content blocks may include a variety of ad unit types (e.g., display, carousel, video, etc. . . . ), and have different starting positions and injection frequencies with respect to each other. In some embodiments, the one or more section codes may be unique for a given publisher.

In an embodiment, the each time a user accesses a publisher HTML document (e.g., via a client device), the single script block generates an asynchronous call, e.g., to an ad server system, to fetch a syndication script that, in some embodiments, also may be generated (e.g., by an ad server) when a publisher creates and saves an ad unit. In some embodiments, the syndication script is stored by being cached on a user browser after it is obtained, e.g., in a client device database.

While the syndication script may not include ad serving logic, it at least enables the receipt of ad serving logic and metadata from an ad server system via an ad call that can be automatically generated and sent to the ad server after download and installation on a user browser. In an embodiment, the syndication script generates an ad call that uses the one or more section codes from the single script block to obtain, from an ad server system, (1) all of the logic needed to inject native ads in accordance with the invention, and (2) all of the metadata needed to inject native ads in accordance with the invention. As such, the ad server response to the ad call may include native ads for the page (e.g., auto-formatted according to the publisher's template) and metadata.

In some embodiments, the metadata may include a template, which is generated by the ad server system using information about the content on the publisher HTML document, and which includes information on how to format the ads to look native to the content format and style. For example, the template may be used to auto-format the ads to appear native on the publisher's site, in response to the ad call (and also, ads selected by the serving system to be returned in response to the ad call may be chosen generally to be appropriate native ads).

In some embodiments, the metadata may include a defined XPath, a start location, a section skip property, a total ad specification (i.e., a maximum number of renderings for the ad), and other ad injection/placement information. The following HTML document ("HTML Document 3") is provided to use as an example:

```
{
    "sections": [{
        "id": "04071982",
        "start": 5,
        "skip": 4,
        "template":
        "https://s.yimg.com/templates/gemini-12062014.plain",
        "xpath": "html/body/div/section/h1/a/../..",
        "totalAds": 5,
        "ads": [{ . . . }]
    },{
        . . .
    }]
}
```

In the HTML document, once the syndication script identifies the correct section and node within its content stream, it may use the XPath to filter all child nodes to only those with matching structures of a section template to ensure repeat injections happen in the correct positions. Once the first native ad has been inserted, the syndicated script will then insert the next native ad based on the section skip property. For example, "Start: 5, Skip: 4" means that the first native ad is to be injected in slot 5, and the following native ad will appear in slot 10.

Therefore, the syndication script logic may utilize the defined XPath to identify a section's content stream, filter its children to only matching structures, and then determine the start position defined in the metadata. The syndication script logic may then begin an ad injection process by injecting a native ad at the start position, and determining next injection points defined by the section skip property (e.g., start+skip), until the total amount of ads, defined by the total ad specification, that are supposed to be rendered are fulfilled.

Figure 7:
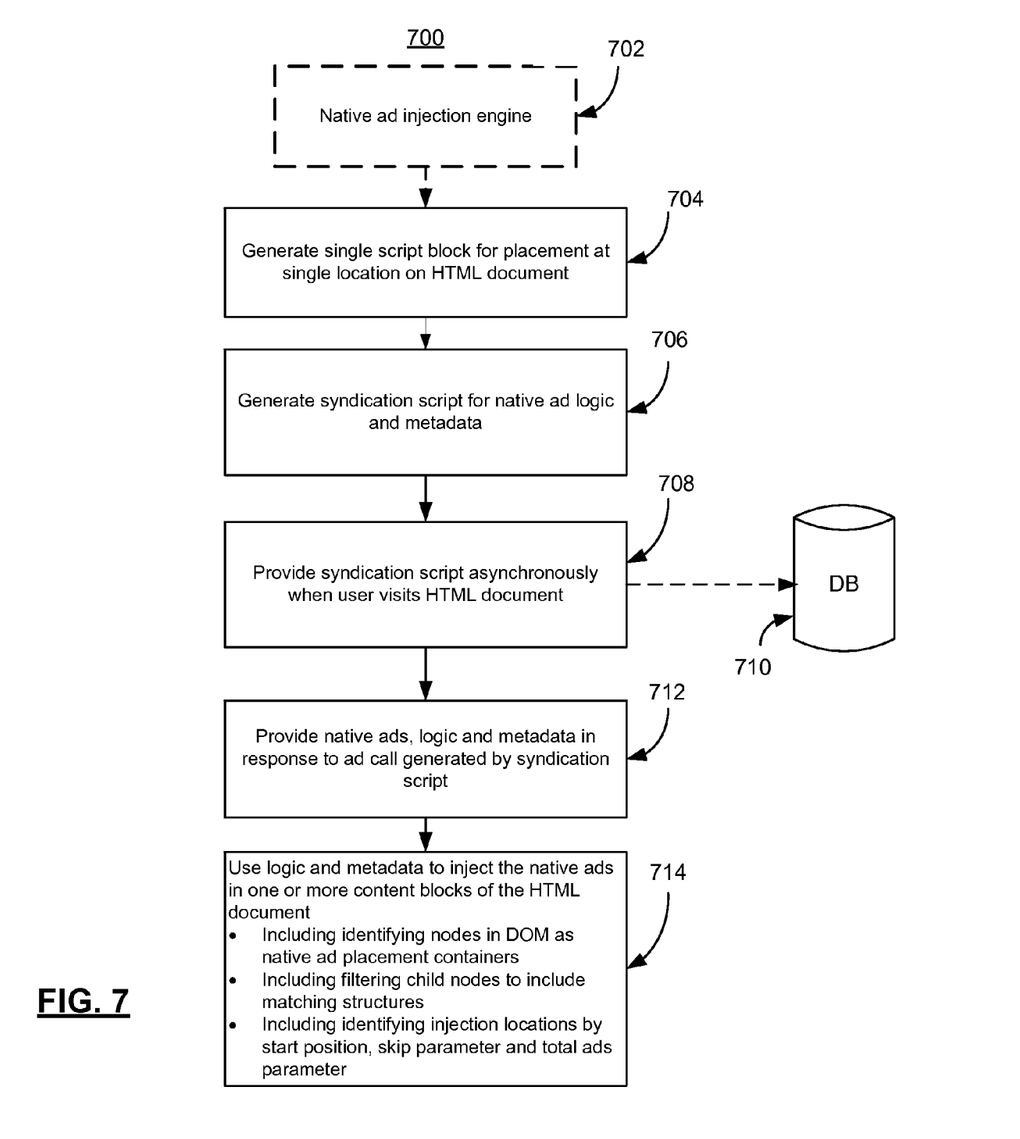
FIG. 7 illustrates a flow diagram of example operations of one or more aspects of a system or method according to one embodiment of the invention.

FIG. 7 illustrates a flow diagram of example operations of one or more aspects of a system or method according to one embodiment of the invention. At step 704, the native advertisement injection engine 702 generates a single script block (e.g., a JavaScript snippet) for placement at a single location on an HTML document in response to a creation of one or more ad units for the HTML document. For example, the single script block may include one or more section codes that correspond to one or more content blocks of the HTML document. In some embodiments, the single script block may be generated in response to inputs at a user interface for creating the one or more ad units for the HTML document. At step 706, a syndication script for obtaining native ad logic and metadata is generated for injecting native advertisements in the HTML document based on the one or more section codes. At step 708, the syndication script is provided in response to a request generated by the single script block. For example, the request for the syndication script may be asynchronously generated by the single script block when a user accesses the HTML document. Also, the syndication script may be stored for installation and execution in a database, such as database 710 which may be located within a client device (e.g., a personal computer, laptop, smartphone, etc.) used to visit the HTML document. At step 712, one or more native advertisements, logic and metadata are provided in response to an ad call generated by the syndication script. In some embodiments, the syndication script may automatically generate the ad call upon storage and installation at a user device used for accessing the HTML document. At step 714, the logic and metadata are used to inject the one or more native advertisements in the one or more content blocks of the HTML document. For example, the metadata may include an XPath per section of the HTML document identifying nodes within a Document Object Model of the HTML document as native ad placement containers. As such, a start position for injecting native advertisements may be identified based on a related XPath. Further, the syndication script may obtain logic for filtering child nodes within the Document Object Model to include only matching structures of the XPath(s) for subsequent injections of native advertisements. In some embodiments, the metadata may also include a skip parameter for determining locations for subsequent injections of native advertisements, and a total ads parameter for determining a maximum number of native advertisements to serve.

As such, advantages of native ad smart injection include: a single script block to manage ad rendering; and multi-ad injection within content blocks that are configurable to take into account ad start position, how often an ad repeats, and a maximum number of ads to serve. Native ad smart injection also supports multiple ad unit types; automated (e.g., no manual intervention) template extraction; and automated customization of an ad unit to appear as native site content.

The various embodiments ease native ad implementation for publishers and allow for easily serving native ads, or adjusting the total number of ads served, on a per section basis, which can increase the number of native ads served, resulting in more impressions, and larger potential revenues. A higher click-through ratio (CTR) may also be achieved since the native ad units appear similarly to the publisher's site content.

The invention claimed is:

1. A system comprising one or more processors and a non-transitory storage medium comprising program logic for execution by the one or more processors, the program logic comprising:
   a native advertisement injection engine that:
      generates a single script block for placement at a single location on an HTML document in response to a creation of one or more ad units for the HTML document, the single script block including one or more section codes that correspond to one or more sections of the HTML document;
      generates a syndication script for obtaining logic and metadata for injecting native advertisements in the HTML document based on the one or more section codes;
      provides the syndication script in response to a request generated by the single script block; and
      provides one or more native advertisements in response to an ad call generated by the syndication script, the one or more native advertisements for injection in the one or more sections of the HTML document based on the logic and metadata, wherein the syndication script obtains, from an advertisement server, logic for filtering child nodes within the Document Object Model to include only matching structures for subsequent injections of native advertisements, and obtains metadata for auto formatting data based on content of the HTML document.

2. The system of claim 1, wherein the metadata includes one or more sections within a Document Object Model of the HTML document as valid content streams for native ad placement containers.

3. The system of claim 1, wherein the metadata includes a start position for injecting native advertisements.

4. The system of claim 1, wherein the metadata includes a skip parameter for determining locations for subsequent injections of native advertisements.

5. The system of claim 1, wherein the metadata includes a total ads parameter for determining a maximum number of native advertisements to serve.

6. The system of claim 1, wherein the single script block is generated in response to inputs at a user interface for creating the one or more ad units for the HTML document.

7. The system of claim 1, wherein the request for the syndication script is asynchronously generated by the single script block when a user accesses the HTML document.

8. The system of claim 1, wherein the syndication script automatically generates the ad call upon storage and installation at a user device used for accessing the HTML document.

9. The system of claim 1, wherein the one or more native advertisements include a plurality of ad unit formats.

10. A method comprising:
   generating a single script block for placement at a single location on an HTML document in response to a creation of one or more ad units for the HTML document, the single script block including one or more section codes that correspond to one or more content blocks of the HTML document;
   generating a syndication script for obtaining logic and metadata for injecting native advertisements in the HTML document based on the one or more section codes;
   providing the syndication script in response to a request generated by the single script block; and
   providing one or more native advertisements in response to an ad call generated by the syndication script, the one or more native advertisements for injection in the one or more content blocks of the HTML document based on the logic and metadata, wherein the metadata includes an XPath per section identifying nodes within a Document Object Model of the HTML document as native ad placement containers, wherein the syndication script obtains, from an advertisement server, logic for filtering child nodes within the Document Object Model to include only matching structures of the XPath(s) for subsequent injections of native advertisements, and obtains metadata for auto formatting data based on content of the HTML document.

11. The method of claim 10, wherein the metadata includes a start position for injecting native advertisements.

12. The method of claim 10, wherein the metadata includes a skip parameter for determining locations for subsequent injections of native advertisements.

13. The method of claim 10, wherein the metadata includes a total ads parameter for determining a maximum number of native advertisements to serve.

14. The method of claim 10, wherein the single script block is generated in response to inputs at a user interface for creating the one or more ad units for the HTML document.

15. The method of claim 10, wherein the request for the syndication script is asynchronously generated by the single script block when a user accesses the HTML document.

16. The method of claim 10, wherein the syndication script automatically generates the ad call upon storage and installation at a user device used for accessing the HTML document.

17. The method of claim 10, wherein the one or more native advertisements include a plurality of ad unit formats.

18. A non-transitory computer readable storage medium or media tangibly storing computer program logic capable of being executed by a computer processor, the program logic comprising:
   native advertisement injection engine logic for:
      generating a single script block for placement at a single location on an HTML document in response to a creation of one or more ad units for the HTML document, the single script block including one or more section codes that correspond to one or more content blocks of the HTML document;
      generating a syndication script for obtaining logic and metadata for injecting native advertisements in the HTML document based on the one or more section codes;
      providing the syndication script in response to a request generated by the single script block; and
      providing one or more native advertisements in response to an ad call generated by the syndication script, the one or more native advertisements for injection in the one or more content blocks of the HTML document based on the logic and metadata, wherein the metadata includes an XPath per section identifying nodes within a Document Object Model of the HTML document as native ad placement containers, wherein the syndication script obtains, from an advertisement server, logic for filtering child nodes within the Document Object Model to include only matching structures of the XPath(s) for subsequent injections of native advertisements, and obtains metadata for auto formatting data based on content of the HTML document.

\* \* \* \* \*